(12) United States Patent
Menon et al.

(10) Patent No.: US 10,971,973 B2
(45) Date of Patent: Apr. 6, 2021

(54) ENERGY CONVERSION APPARATUS

(71) Applicant: ROLLS-ROYCE PLC, London (GB)

(72) Inventors: Kalyani G Menon, Derby (GB);
Richard Harwood, Derby (GB)

(73) Assignee: ROLLS-ROYCE plc, London (GB)

( * ) Notice: Subject to any disclaimer, the term of this patent is extended or adjusted under 35 U.S.C. 154(b) by 1101 days.

(21) Appl. No.: 15/399,399

(22) Filed: Jan. 5, 2017

(65) Prior Publication Data

US 2017/0214294 A1 Jul. 27, 2017

(30) Foreign Application Priority Data

Jan. 26, 2016 (GB) ...................................... 1601392

(51) Int. Cl.
| | |
|---|---|
| *H02K 9/19* | (2006.01) |
| *H02K 9/20* | (2006.01) |
| *H02K 11/33* | (2016.01) |
| *F01D 15/10* | (2006.01) |
| *H02K 5/18* | (2006.01) |

(Continued)

(52) U.S. Cl.
CPC .............. *H02K 9/19* (2013.01); *F01D 15/10* (2013.01); *H02K 5/18* (2013.01); *H02K 5/20* (2013.01); *H02K 9/10* (2013.01); *H02K 9/20* (2013.01); *H02K 11/33* (2016.01); *F05D 2220/32* (2013.01)

(58) Field of Classification Search
CPC .. H02K 5/20; H02K 5/02; H02K 5/04; H02K 5/08; H02K 9/16; H02K 9/19; H02K 9/18; H02K 9/197; H02K 9/20; H02K 9/06

USPC ...... 310/52, 54, 58, 59, 12.29, 12.01, 89, 64
See application file for complete search history.

(56) References Cited

U.S. PATENT DOCUMENTS

| | | | |
|---|---|---|---|
| 5,283,488 A * | 2/1994 | Ponnappan | .............. H02K 9/20 310/54 |
| 5,629,573 A | 5/1997 | Ponnappan et al. | |

(Continued)

FOREIGN PATENT DOCUMENTS

| | | |
|---|---|---|
| DE | 3601089 A1 | 5/1987 |
| DE | 102009012324 A1 | 9/2010 |

(Continued)

OTHER PUBLICATIONS

Jul. 21, 2016 Great Britain Search Report issued in Patent Application No. 1601392.2.

(Continued)

*Primary Examiner* — Bryan R Perez
(74) *Attorney, Agent, or Firm* — Oliff PLC (57) ABSTRACT

Energy conversion apparatus comprising: an electrical machine including a rotor arranged to rotate about an axis, the rotor defining a first cavity therein; power electronic circuitry arranged at least partially around the axis and defining a second cavity therein, the power electronic circuitry being positioned adjacent to the electrical machine; a heat pipe positioned within the first cavity of the rotor and within the second cavity defined by the power electronic circuitry, the heat pipe being arranged to receive thermal energy from the rotor; and a cooling arrangement positioned at least partially within the second cavity and arranged to receive thermal energy from the power electronic circuitry and from the heat pipe.

13 Claims, 7 Drawing Sheets

(51) Int. Cl.
*H02K 5/20* (2006.01)
*H02K 9/10* (2006.01)

(56) References Cited

U.S. PATENT DOCUMENTS

| | | | |
|---|---|---|---|
| 2003/0102728 A1* | 6/2003 | Chen | H02K 9/19 |
| | | | 310/52 |
| 2003/0132040 A1* | 7/2003 | Radosevich | B60L 15/007 |
| | | | 180/65.1 |
| 2006/0082228 A1 | 4/2006 | Urbahn et al. | |
| 2007/0200438 A1* | 8/2007 | Kaminski | F04D 1/063 |
| | | | 310/54 |
| 2012/0085519 A1 | 4/2012 | Chou | |
| 2013/0313928 A1* | 11/2013 | McKinzie | H02K 1/32 |
| | | | 310/54 |
| 2014/0368064 A1 | 12/2014 | Fedoseyev et al. | |

FOREIGN PATENT DOCUMENTS

| | | |
|---|---|---|
| DE | 102014205930 A1 | 10/2015 |
| EP | 0039493 A2 | 11/1981 |
| GB | 2515318 A | 12/2014 |
| JP | H11-164521 A | 6/1999 |

OTHER PUBLICATIONS

M. Hoffman et al., "Modular inverter power electronic for intelligent e-drives," in 2nd International Conference on Electric Drives Production, Nuremburg, 2012.

M. Marz et al., "Power electronics system integration for electric and hybrid vehicles," in 6th International Conference pri Integrated Power Electronics Systems, Nuremburg, 2010.

May 30, 2017 European Search Report issued in European Patent Application No. 17150343.

Aug. 31, 2020 Office Action issued in European Patent Application No. 17 150 343.6.

Schroeder, E. et al., "Development of Electric Propulsion Motors with Integrated Power Electronics," Electric Machine Technology Symposium, pp. 1-5, Jan. 27-29, 2004.

\* cited by examiner

ENERGY CONVERSION APPARATUS

TECHNOLOGICAL FIELD

The present disclosure concerns energy conversion apparatus.

BACKGROUND

Electrical machines, such as electrical generators and electrical motors, are usually electrically connected to power electronic circuitry that controls the operation of the electrical machine. For example, power electronic circuitry may include converter circuitry that converts direct current (DC) or alternating current (AC) into variable frequency alternating current (AC) in order to control the speed or torque of the electrical machine.

In operation, the electrical machine and the power electronic circuitry may each generate thermal energy that deteriorates the performance of the electrical machine and/or the power electronic circuitry. Furthermore, the electrical connection between the electrical machine and the power electronic circuitry may be a source of electromagnetic interference for the electrical machine and the power electronic circuitry.

BRIEF SUMMARY

According to various examples there is provided energy conversion apparatus comprising: an electrical machine including a rotor arranged to rotate about an axis, the rotor defining a first cavity therein; power electronic circuitry arranged at least partially around the axis and defining a second cavity therein, the power electronic circuitry being positioned adjacent to the electrical machine; a heat pipe positioned within the first cavity of the rotor and within the second cavity defined by the power electronic circuitry, the heat pipe being arranged to receive thermal energy from the rotor; and a cooling arrangement positioned at least partially within the second cavity and arranged to receive thermal energy from the power electronic circuitry and from the heat pipe.

The cooling arrangement may comprise: an inlet to receive a cooling fluid; and an outlet to output the cooling fluid, the second cavity being arranged to receive the cooling fluid from the inlet and to provide the cooling fluid to the outlet.

The cooling arrangement may comprise a pump to cause the cooling fluid to flow from the inlet to the outlet.

The cooling arrangement may comprise a plurality of first fins extending from the heat pipe into the second cavity.

At least a subset of the plurality of first fins may be oriented at a non-perpendicular angle relative to the axis to cause the cooling fluid to flow from the inlet to the outlet during operation of the rotor.

The cooling fluid may be a liquid.

The cooling fluid may be a gas.

The cooling arrangement may comprise a plurality of second fins extending from the power electronic circuitry to the second cavity.

The electrical machine may comprise a stator having an electrical conductor. The cooling arrangement may be arranged to receive thermal energy from the electrical conductor. The electrical conductor may be a stator winding.

The electrical machine may be a motor.

The electrical machine may be a generator.

The electrical machine and the power electronic circuitry may be integral with one another.

According to various examples there is provided a gas turbine engine comprising energy conversion apparatus as described in any of the preceding paragraphs.

According to various examples there is provided a vehicle comprising energy conversion apparatus as described in any of the preceding paragraphs.

The skilled person will appreciate that except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

BRIEF DESCRIPTION

Embodiments will now be described by way of example only, with reference to the Figures, in which.

DETAILED DESCRIPTION

In the following description, the terms 'connected' and 'coupled' mean operationally connected and coupled. It should be appreciated that there may be any number of intervening components between the mentioned features, including no intervening components.

Figure 1:
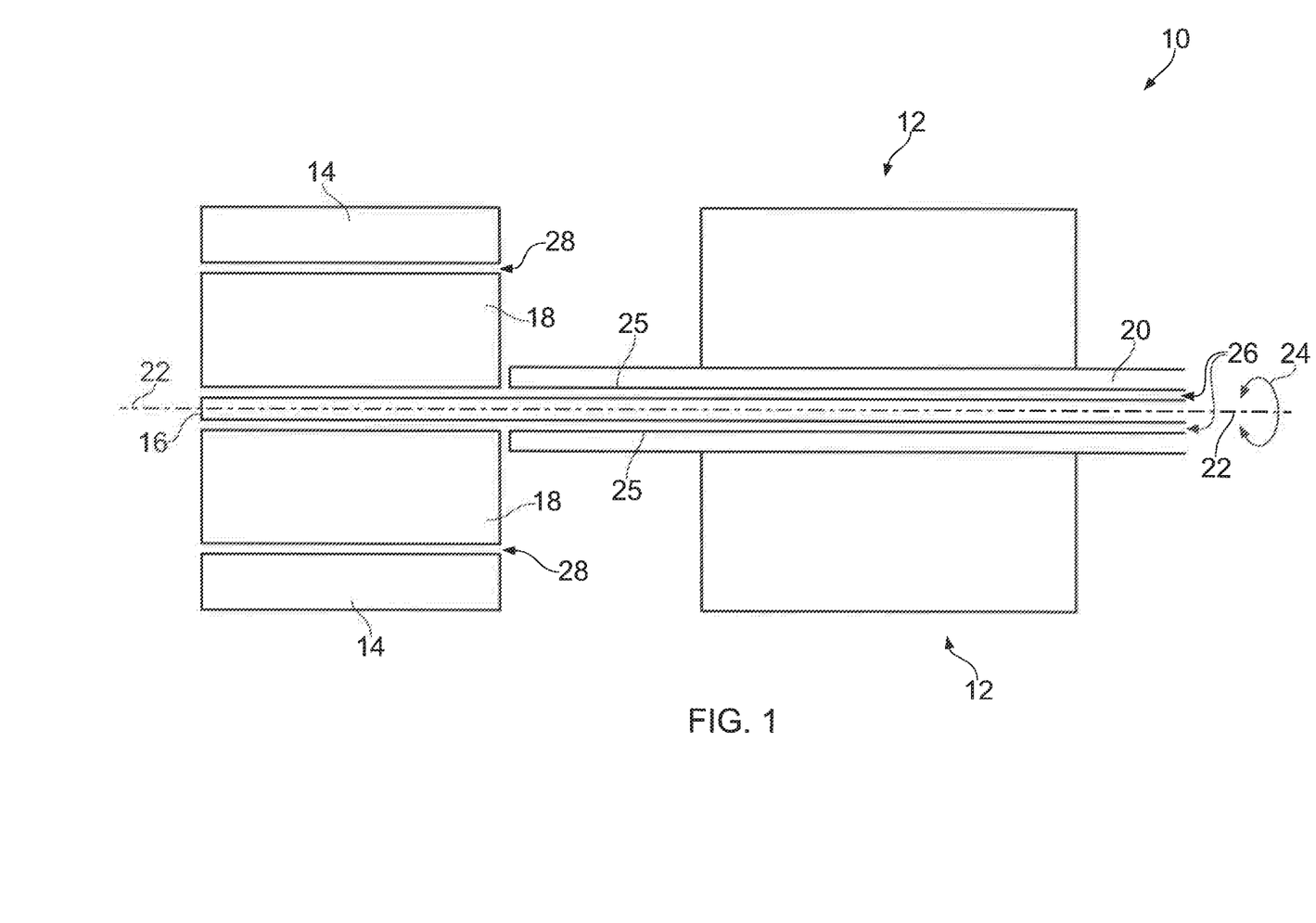
FIG. 1 illustrates a schematic cross sectional side view diagram of an energy conversion apparatus according to various examples.

FIG. 1 illustrates an energy conversion apparatus 10 according to various examples. The energy conversion apparatus 10 includes an electrical machine 12, power electronic circuitry 14, a heat pipe 16 and a cooling arrangement 18. In summary, the energy conversion apparatus 10 is arranged so that, during operation, the cooling arrangement 18 receives thermal energy from the electrical machine 12 (via the heat pipe 16) and from the power electronic circuitry 14 to cool the electrical machine 12 and the power electronic circuitry 14 respectively.

The electrical machine 12 may be any suitable electrical machine and may comprise a motor and/or a generator. The electrical machine 12 includes a rotor 20 that is arranged to rotate about an axis 22 as indicated by arrow 24. The rotor 20 has an inner surface 25 that defines a first cavity 26 that extends along the length of the rotor 20 and parallel to the axis 22. It should be appreciated that the electrical machine 12 may include further components (such as a stator, an electrical conductor, and so on) and these are not illustrated in FIG. 1 to maintain the clarity of the figure.

The power electronic circuitry 14 may include any suitable power electronics for the electrical machine 12. For example, the power electronic circuitry 14 may comprise converter circuitry that is configured to convert direct current or alternating current into variable frequency alternating current in order to control the torque of the electrical machine 12. By way of another examples, the power electronic circuitry 14 may comprise circuitry configured to control wound field motors.

The power electronic circuitry 14 is positioned at least partially around the axis 22. For example, the power electronic circuitry 14 may form a circular or polygonal annulus around the axis 22 or may form a portion of such an annulus (for example, an arc or a segment of a circle where the axis 22 is the origin of the circle). The power electronic circuitry 14 defines a second cavity 28 therein that extends along the axis 22.

The power electronic circuitry 14 is positioned adjacent to the electrical machine 12 along the axis 22. In some examples, the power electronic circuitry 14 may be integral with the electrical machine 12. The power electronic circuitry 14 and the electrical machine 12 may be housed within the same housing. For example, the power electronic circuitry 14 may be integral with (that is, contained within) the housing of the electrical machine 12 (such as a motor housing). Alternatively, a housing of the power electronic circuitry 14 may be coupled to a housing of the electrical machine 12. The coupling may be via an adhesive (such as glue) and/or via mechanical fasteners (such as screws). In such an example, the housing of the power electronic circuitry 14 may contact/touch the housing of the electrical machine 12. In other examples, the power electronic circuitry 14 may not be integral with the electrical machine 12 (that is, the power electronic circuitry 14 and the electrical machine 12 may not share a housing, or have coupled housings) and a gap may be defined between the power electronic circuitry 14 and the electrical machine 12.

The heat pipe 16 may be any suitable heat pipe and may include an outer casing, a wick, and a cavity containing a liquid (not illustrated to maintain the clarity of FIG. 1). For example, the heat pipe 16 may comprise a copper pipe, a sintered metal powder wick, and water. By way of another example, the heat pipe 16 may comprise an aluminium pipe, a sintered metal powder wick, and ammonia. The heat pipe 16 is positioned within the first cavity 26 of the rotor 20 and within the second cavity 28 defined by the power electronic circuitry 14. The heat pipe 16 is arranged to receive thermal energy from the rotor 20. For example, the heat pipe 16 may be in contact with the inner wall 25 of the rotor 20 and thermal energy may be transferred from the rotor 20 to the heat pipe 16 via thermal conduction.

In operation, the rotor 20 rotates about the axis 22 and generates thermal energy. The heat pipe 16 receives the thermal energy from the rotor 20 and the liquid within the heat pipe 16 vaporises. The vapour then travels along the heat pipe 16 towards the power electronic circuitry 14 and condenses back into a liquid, thereby releasing latent heat. The liquid then travels towards the rotor 20 in the wick through capillary action.

The cooling arrangement 18 is positioned at least partially within the second cavity 28 and is arranged to receive thermal energy from the power electronic circuitry 14 and thermal energy from the heat pipe 16 (that is, the latent heat released by the heat pipe 16). The cooling arrangement 18 is described in greater detail in the following paragraphs with reference to FIGS. 2 to 6.

The energy conversion apparatus 10 may provide several advantages. First, the energy conversion apparatus 10 may have a relatively high volumetric and mass power density since the cooling arrangement 18 is shared between the electrical machine 12 and the power electronic circuitry 14. The power density of the energy conversion apparatus 10 may also be relatively high where the electrical machine 12 and the power electronic circuitry 14 are integral with one another since less material and cabling may be required to facilitate mounting of both the electrical machine 12 and the power electronic circuitry 14. Second, the integration of the electrical machine 12 and the power electronic circuitry 14 may reduce electromagnetic interference through shorter electrical connections between the power electronic circuitry 14 and the electrical machine 12.

Figure 2:
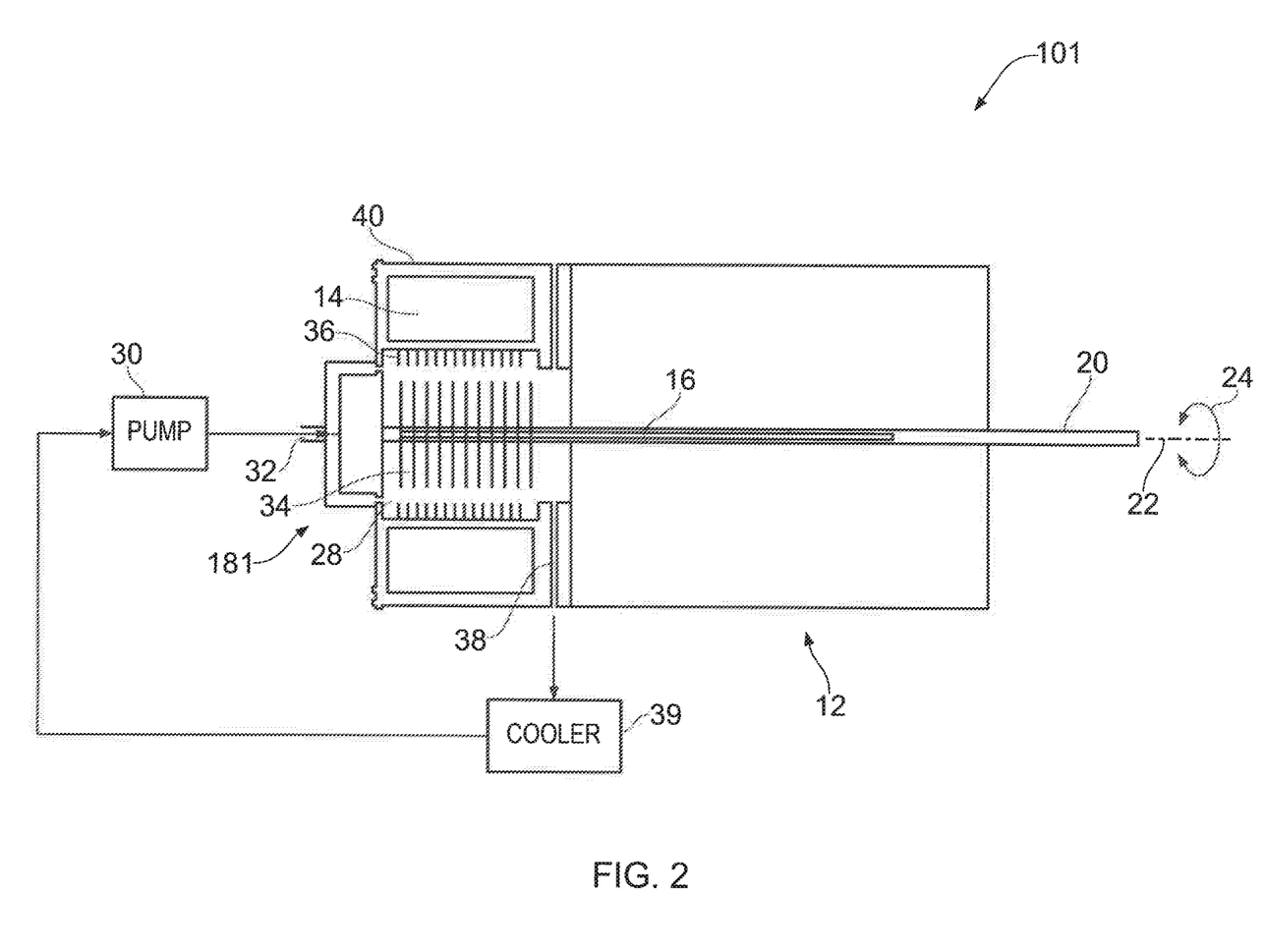
FIG. 2 illustrates a schematic cross sectional side view diagram of another energy conversion apparatus according to various examples.

FIG. 2 illustrates a schematic cross sectional side view diagram of another energy conversion apparatus 101 according to various examples. The energy conversion apparatus 101 is similar to the energy conversion apparatus 10 and where the features are similar, the same reference numerals are used. The energy conversion apparatus 101 includes a cooling arrangement 181 that comprises a pump 30, an inlet 32, a plurality of first fins 34, a plurality of second fins 36, an outlet 38, and a cooler 39. Additionally, the energy conversion apparatus 101 includes a housing 40 that houses the power electronic circuitry 14 therein. The rotor 20, in addition to the heat pipe 16, extends into the second cavity 28.

The pump 30 is arranged to provide coolant to the inlet 32. The coolant may comprise any suitable liquid and examples include, but are not limited to, ethylene glycol and water. The second cavity 28 is connected to the inlet 32 and is arranged to receive the coolant from the inlet 32.

Figure 3:
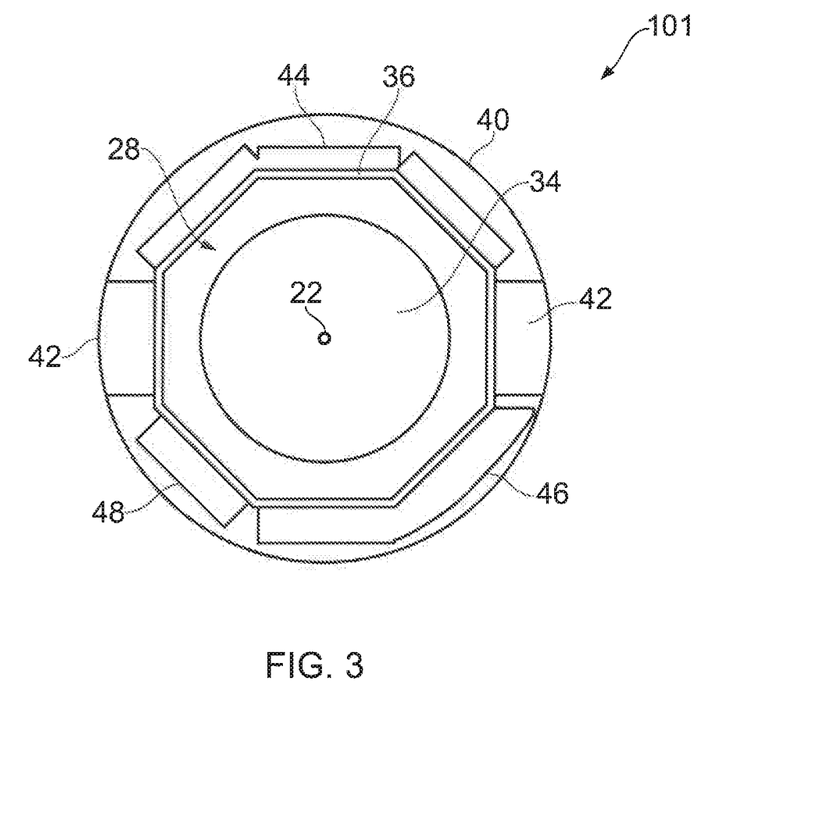
FIG. 3 illustrates a schematic cross sectional front view diagram of the energy conversion apparatus illustrated in FIG. 2.

The plurality of first fins 34 extend from the heat pipe 16 and into the second cavity 28. The plurality of first fins 34 are oriented perpendicular to the axis 22, but may be oriented at a non-perpendicular angle relative to the axis 22 in other examples. The plurality of first fins 34 may have any suitable shape. For example, the first fins 34 may have a circular shape when viewed from the front as illustrated in FIG. 3. The plurality of first fins 34 increase the rate of thermal energy transferred from the heat pipe 16 to the coolant in the second cavity 28 since they provide an increased surface area and cause turbulent flow of coolant within the second cavity 28.

The plurality of second fins 36 extend from the housing 40 and into the second cavity 29. The plurality of second fins 36 are oriented perpendicular to the axis 22, but may be oriented at a non-perpendicular angle relative to the axis 22 in other examples. The plurality of second fins 36 may have any suitable shape and may have a circular or polygonal ring shape when viewed from the front. Similar to the first fins 34, the plurality of second fins 36 are provided to increase the rate of thermal energy transferred from the power electronic circuitry 14 to the coolant in the second cavity 28.

The outlet 38 is connected to the second cavity 28 and is arranged to receive the coolant from the second cavity 28. The cooler 39 is connected to the outlet 38 and is arranged to receive the coolant from the outlet 38, remove thermal energy from the coolant, and then provide the coolant to the pump 30 for re-circulation within the second cavity 28. The cooler 39 may include any suitable apparatus for cooling the coolant, and may comprise a heat exchanger or a refrigerant loop for example.

FIG. 3 illustrates a schematic cross sectional front view of the energy conversion apparatus 101 through the power electronic circuitry 14. The housing 40 of the power electronic circuitry 14 includes structural supports 42 that extend between an outer surface and an inner surface of the housing 40. The power electronic circuitry 14 may include (but is not limited to) power electronic switches 44, passive circuitry 46, and control circuitry 48 that are arranged around the axis 22. The structural supports 42, the power electronic switches 44, the passive circuitry 46 and the control circuitry 48 define a polygonal ring around the axis 22.

Figure 4:
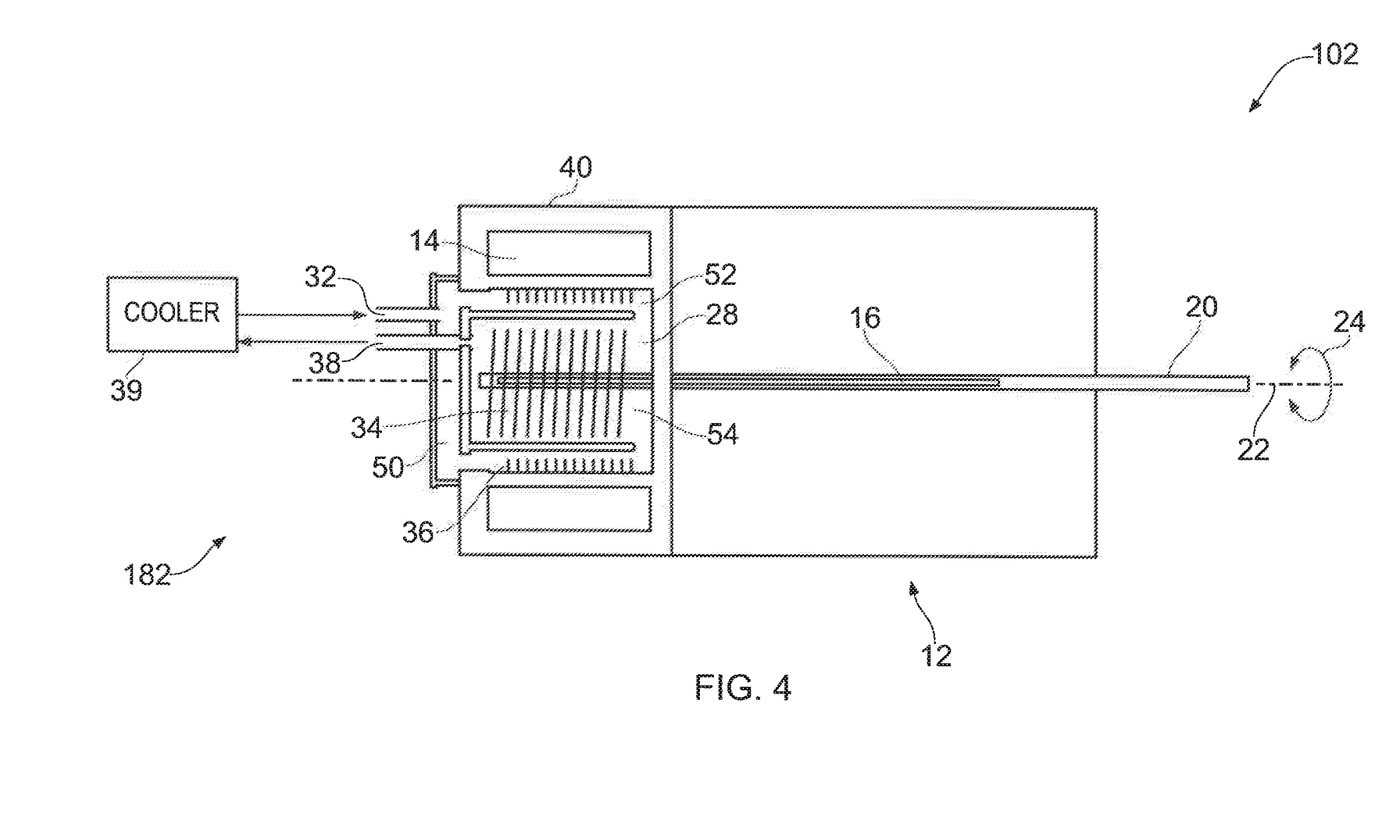
FIG. 4 illustrates a schematic cross sectional side view diagram of a further energy conversion apparatus according to various examples.
Figure 5:
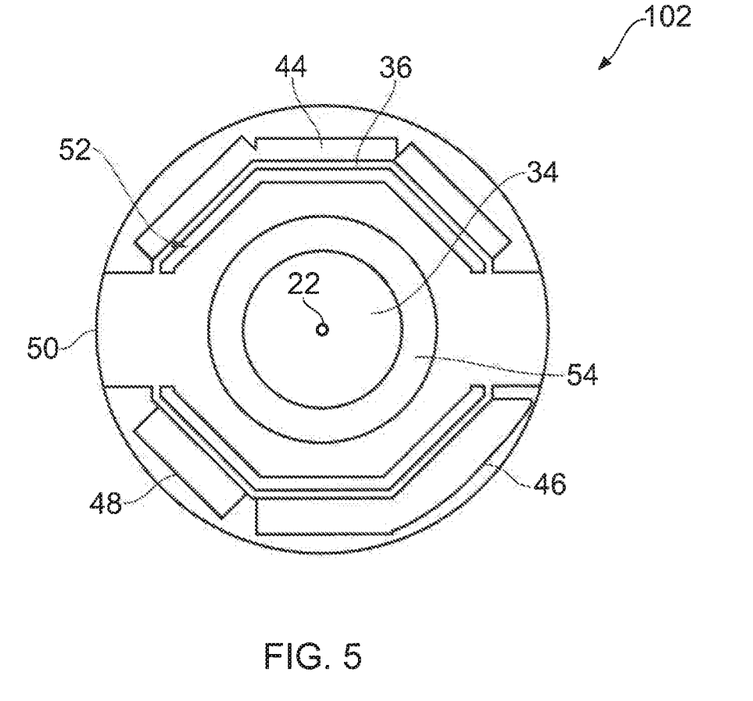
FIG. 5 illustrates a schematic cross sectional front view diagram of the energy conversion apparatus illustrated in FIG. 4.

FIGS. 4 and 5 illustrate another energy conversion apparatus 102 according to various examples. The energy conversion apparatus 102 is similar to the energy conversion apparatus 101 and where the features are similar, the same reference numerals are used.

The energy conversion apparatus 102 differs from the energy conversion apparatus 101 in that the cooling arrangement 182 may not include a pump 30 and instead the plurality of first fins 34 are oriented at a non-perpendicular angle relative to the axis 22. In other words, the plurality of first fins 34 extend axially as well as radially and tangentially from the heat pipe 16 relative to the axis 22. The energy conversion apparatus 102 also differs from the energy conversion apparatus 101 in that the cooling arrangement 182 further comprises a structural support and coolant guide 50 that defines a first channel 52 (that includes the second fins 36) and a second channel 54 (that includes the first fins 34) for the flow of coolant.

In operation, rotation of the rotor 20 about the axis 22 causes the plurality of first fins 34 to rotate about the axis 22. Due to the non-perpendicular angle of the first fins 34 relative to the axis 22, the rotation of the first fins 34 causes coolant to flow within the second cavity 28. In particular, rotation of the first fins 34 causes coolant to be drawn from the cooler 39 and through the inlet 32, through the first channel 52 and then the second channel 54, and then return to the cooler 39 via the outlet 38. It should be appreciated that where the direction of rotation of the rotor 20 (and thus the first fins 34) is reversed, the coolant will flow in the opposite direction (that is, coolant will be drawn from the cooler 39, through the second channel 54 and then through the first channel 52).

The energy conversion apparatus 102 may provide several advantages. For example, the energy conversion apparatus 102 may have a relatively high volumetric and mass power density since the energy conversion apparatus 102 may not comprise the pump 30.

Figure 6:
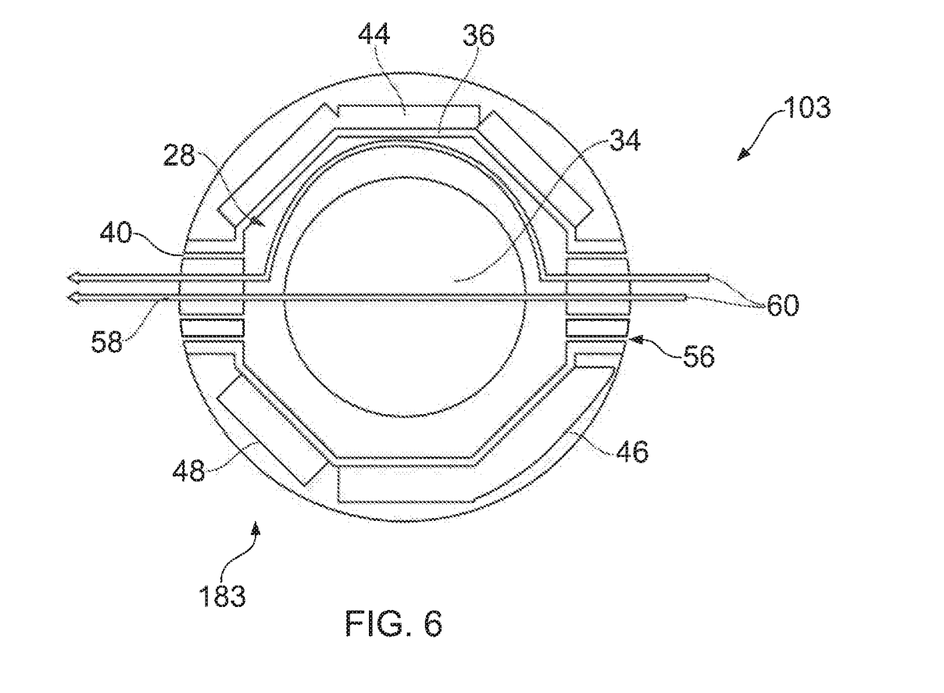
FIG. 6 illustrates a schematic cross sectional front view diagram of another energy conversion apparatus according to various examples.

FIG. 6 illustrates a schematic cross sectional front view diagram of another energy conversion apparatus 103 according to various examples. The energy conversion apparatus 103 is similar to the energy conversion apparatus 10, 101, 102, and where the features are similar, the same reference numerals are used.

The energy conversion apparatus 103 differs from the energy conversion apparatus 10, 101, 102 in that the rotor 20 and the power electronic circuitry 14 are cooled via a gaseous coolant (such as air). In more detail, the energy conversion apparatus 103 includes a cooling arrangement 183 that comprises a gas inlet 56 and a gas outlet 58. In operation, gaseous coolant 60 is supplied to the second cavity 28 via the gas inlet 56 and thermal energy is transferred from the first and second fins 34, 36 to the gaseous coolant 60. The gaseous coolant 60 is then exhausted from the gas outlet 58.

The energy conversion apparatus 103 may be advantageous in that the energy conversion apparatus 103 may not require the liquid cooling connections and pipework (as illustrated in FIGS. 2 to 5 for example). Consequently, the energy conversion apparatus 103 may have a relatively high volumetric and mass power density.

It will be understood that the invention is not limited to the embodiments above-described and various modifications and improvements can be made without departing from the concepts described herein. For example, the energy conversion apparatus 10, 101, 102, 103 may comprise a thermal energy transfer window instead of, or in addition to, the plurality of second fins 36 to accommodate modules having fins integrated onto their baseplates. Thermal energy may also be transferred from the power electronic circuitry 14 via a baseplate-heat sink interface and fins on the inside of the structural support of the housing 40 (that is, fins that extend towards the power electronic circuitry 14). The plurality of fins 34 may define a spiral within the second cavity 28.

Figure 7:
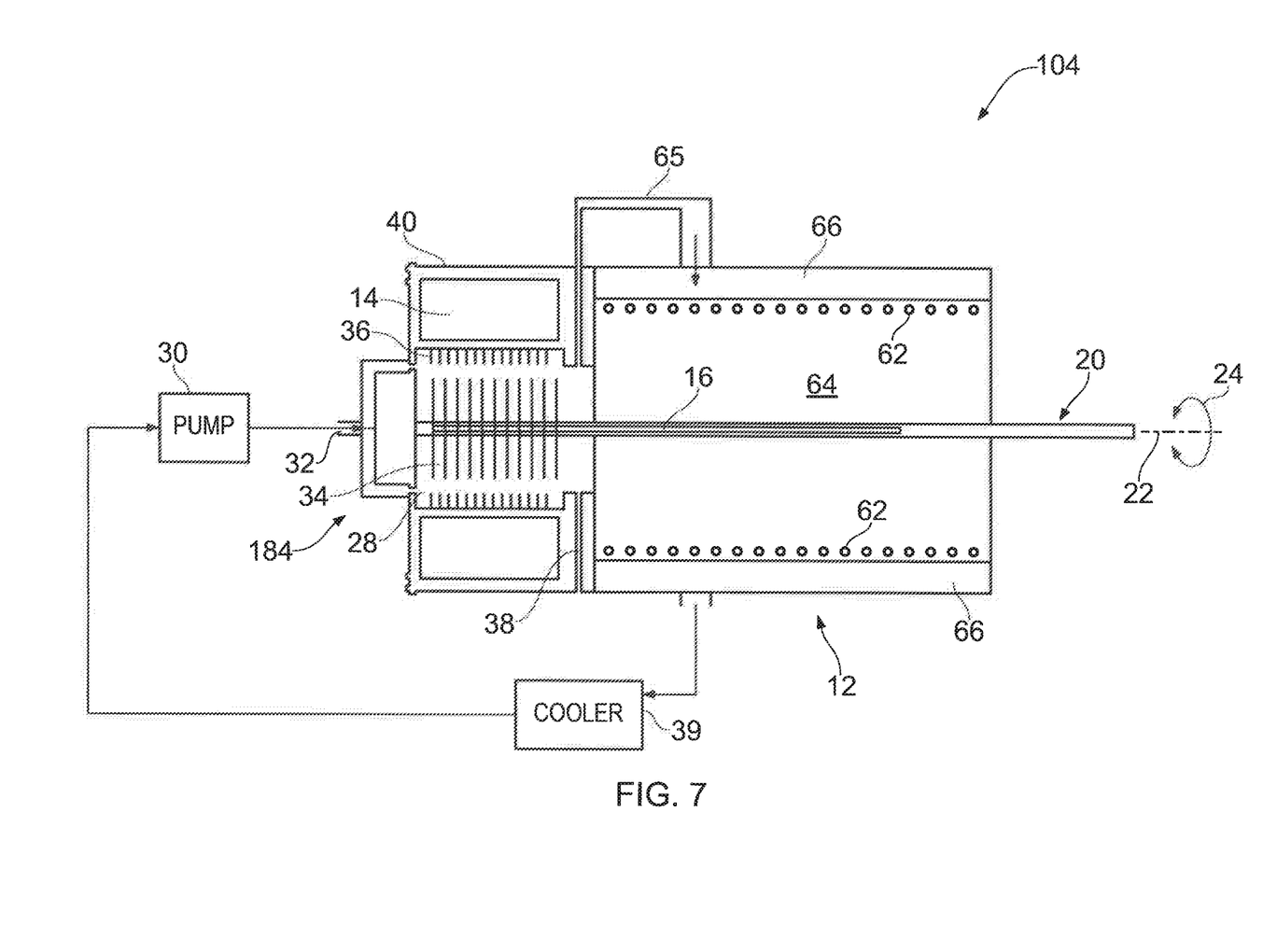
FIG. 7 illustrates a schematic cross sectional side view diagram of another energy conversion apparatus according to various examples.

In some examples, a cooling arrangement 184 may be arranged to receive thermal energy from an electrical conductor 62 (a stator winding for example) mounted on a stator 64 of the electrical machine 12 as illustrated in FIG. 7. In more detail, the energy conversion apparatus 104 is arranged so that the coolant loop 65 of the cooling arrangement 18 is connected to a cooling structure 66 (such as a heat exchanger) within the stator 64 to provide further cooling to the electrical machine 12. Consequently, the cooling arrangement 184 may be used to provide cooling to various components of the electrical machine 12 and power electronics circuitry 14 without the use of dedicated manifolds.

In some examples, the housing of the electrical machine 12 may be manufactured using additive layer manufacturing (ALM) to enable the housing to have a relatively complex shape.

The power electronic circuitry 14 may additionally include sensors, protection circuitry, bus bars and so on.

Except where mutually exclusive, any of the features may be employed separately or in combination with any other features and the disclosure extends to and includes all combinations and sub-combinations of one or more features described herein.

What is claimed is:

1. Energy conversion apparatus comprising: an electrical machine including a rotor arranged to rotate about an axis, the rotor defining a first cavity therein; power electronic circuitry arranged at least partially around the axis and defining a second cavity therein, the power electronic circuitry being positioned adjacent to the electrical machine; a heat pipe positioned within the first cavity of the rotor and within the second cavity defined by the power electronic circuitry, the heat pipe being arranged to receive thermal energy from the rotor; and a cooling arrangement positioned at least partially within the second cavity and arranged to receive thermal energy from the power electronic circuitry and from the heat pipe;

wherein the cooling arrangement comprises: an inlet to receive a cooling fluid; and an outlet to output the cooling fluid, the second cavity being arranged to receive the cooling fluid from the inlet and to provide the cooling fluid to the outlet.

2. Energy conversion apparatus as claimed in claim 1, wherein the cooling arrangement comprises a pump to cause the cooling fluid to flow from the inlet to the outlet.

3. Energy conversion apparatus as claimed in claim 1, wherein the cooling arrangement comprises a plurality of first fins extending from the heat pipe into the second cavity.

4. Energy conversion apparatus as claimed in claim 3, wherein at least a subset of the plurality of first fins are oriented at a non-perpendicular angle relative to the axis to cause the cooling fluid to flow from the inlet to the outlet during operation of the rotor, and the cooling arrangement further comprises a structural support and coolant guide that defines a first channel comprising a plurality of second fins and a second channel comprising the plurality of first fins for the flow of coolant.

5. Energy conversion apparatus as claimed in claim 1, wherein the cooling fluid is a liquid.

6. Energy conversion apparatus as claimed in claim 1 wherein the cooling fluid is a gas, and the energy conversion apparatus further comprises a housing that houses the power electronic circuitry therein, the inlet and the outlet being defined by the housing.

7. Energy conversion apparatus as claimed in claim 1, wherein the cooling arrangement comprises a plurality of second fins extending from the power electronic circuitry to the second cavity.

8. Energy conversion apparatus as claimed in claim 1, wherein the electrical machine comprises a stator having an electrical conductor, the cooling arrangement being arranged to receive thermal energy from the electrical conductor.

9. Energy conversion apparatus as claimed in claim 1, wherein the electrical machine is a motor.

10. Energy conversion apparatus as claimed in claim 1, wherein the electrical machine is a generator.

11. Energy conversion apparatus as claimed in claim 1, wherein the electrical machine and the power electronic circuitry are integral with one another.

12. A gas turbine engine comprising energy conversion apparatus as claimed in claim 1.

13. A vehicle comprising energy conversion apparatus as claimed in claim 1.

* * * * *